Sept. 22, 1931.　　　　T. BIRD　　　　1,824,702

JOURNAL BOX AND BEARING

Filed April 24, 1929　　　2 Sheets-Sheet 1

INVENTOR
Theodore Bird
BY
ATTORNEYS

Sept. 22, 1931.  T. BIRD  1,824,702
JOURNAL BOX AND BEARING
Filed April 24, 1929   2 Sheets-Sheet 2

INVENTOR
Theodore Bird
BY
ATTORNEYS

WITNESSES

Patented Sept. 22, 1931

1,824,702

UNITED STATES PATENT OFFICE

THEODORE BIRD, OF SCRANTON, PENNSYLVANIA

JOURNAL BOX AND BEARING

Application filed April 24, 1929. Serial No. 357,829.

This invention relates to bearings, and has particular reference to certain improvements in journal boxes and bearings for mine cars, tipple cars or other similar light cars of these types.

In order to generally improve and simplify the construction of journal boxes and bearings of this nature and to overcome certain objections and disadvantages which have been found to exist in the usual types now in general use, the present invention aims for one of its principal objects to provide a journal box equipped with a liquid lubricant reservoir and formed with a socket for the journal bearing, which socket communicates with the reservoir and by virtue of which arrangement, the bearing will be periodically supplied with lubricant both by splashing and gravitational action resulting from the sudden startings and stoppings of the car whereby proper lubrication and the elimination of hot boxes are insured.

The invention further comprehends a journal bearing block which is preferably constructed of hard wood or an equivalent absorbent material, which is initially impregnated with a lubricant and which is snugly fitted in a socket in a journal box, which box is provided with one or more liquid lubricant reservoirs having communication with the socket in order to supply lubricant to the journal bearing block for maintaining the same in a thoroughly saturated condition.

More specifically, the invention contemplates a journal box having a socket for receiving a hard wood or similar absorbent bearing block, which socket and block are so shaped and interfitted as to preclude splitting of the block.

As a still further object, the invention embodies a journal box and bearing provided with registering lubricant ports and passages which insure a uniform distribution of the lubricant received from a lubricant reservoir constituting a part of the journal box.

With the above recited and other objects in view, reference is had to the following description and accompanying drawings, in which there is exhibited one example or embodiment of the invention, while the claims define the actual scope of the same.

Figure 1:
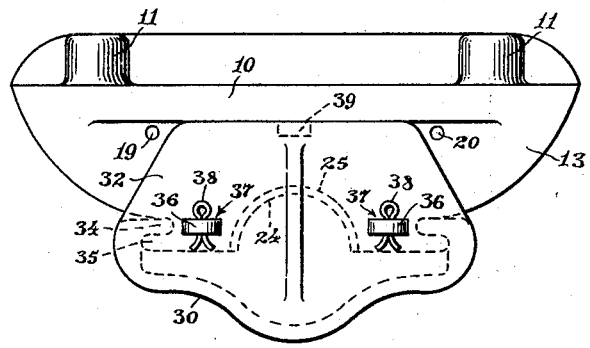
Figure 1 is an outer side view of the journal box.
Figure 2:
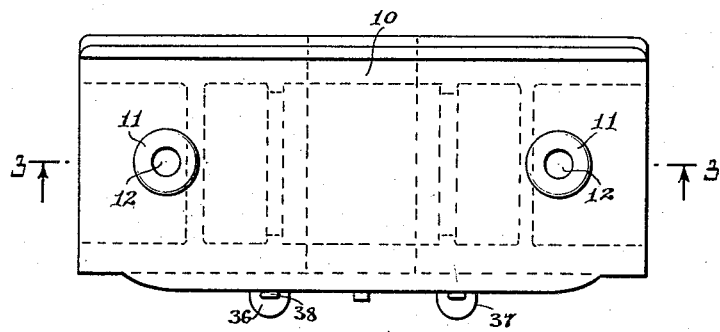
Figure 2 is a plan view thereof.
Figure 3:
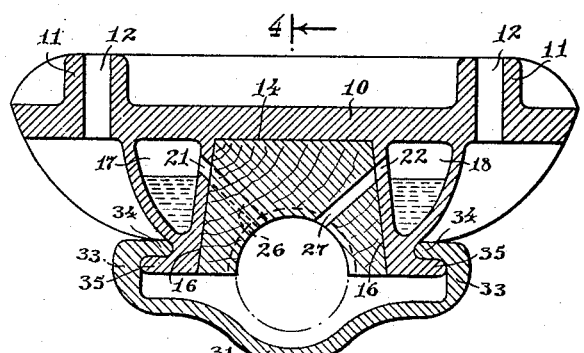
Figure 3 is a longitudinal sectional view through the journal box and bearing block.

Referring to the drawings by characters of reference, 10 designates the upper wall of the journal box, which wall is provided with the usual upstanding bosses 11 adapted to fit within correspondingly shaped recesses in the sill A of the car when the upper surface of the wall 10 is applied to the under surface of the car sill. The wall 10 and bosses 11 are provided with the usual bore 12 designed to receive the bolts for attaching the journal box to the car. The wall 10 is provided with a depending portion 13 intermediate its length, and said portion 13 is provided with a centrally disposed socket 14 which is open at the lower end and closed at the upper end by the lower surface of the wall 10. Preferably, the socket 14 is formed with upwardly converging and downwardly diverging side and end walls 15 and 16. The depending portion 13 between its opposite ends and the end wall 16 of the socket is provided with hollow chambers 17 and 18 adapted to contain lubricant and to constitute liquid lubricant reservoirs. These hollow spaces or chambers 17 and 18 are provided with filling openings 19 and 20 which extend through the outer side wall of the depending portion 13 adjacent the upper end of the chambers and slightly below the upper wall 10 of the journal box. In the preferred form of the invention, outlet ports or slots 21 and 22 are formed in the walls 16 adjacent the upper portion thereof, and said ports incline downwardly from the chambers 17 and 18 to the socket 14 and serve to establish communication between the lubricant reservoirs and said socket for a purpose that will be hereafter set forth.

Figure 5:
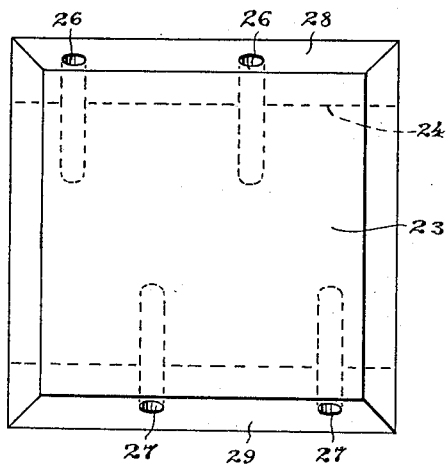
Figure 5 is an enlarged plan view of the block.
Figure 6:
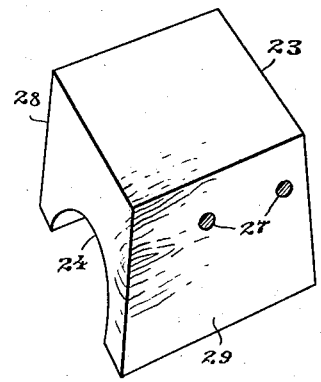
Figure 6 is a perspective view of the block.

The journal bearing block designated generally by the reference character 23 is in the nature of a frustum of a square pyramid and conforms generally to the size and configuration of the socket 14. The journal block is formed on its under side with a transverse substantially semi-circular groove 24 and the side walls of the depending portion 13 are similarly formed with the transversely disposed aligned semi-circular notches 25. The journal bearing block 23 is provided with lubricant passages 26 and 27 which extend through its opposite end walls 28 and 29 which fit against the end walls 16 of the socket 14, and said lubricant passages are adapted to register with the outlet slots or ports 21 and 22. The lubricant passages 26 and 27 lead inwardly and downwardly at an angle from the walls 28 and 29 to the semi-circular groove 24 which accommodates the journal B of the car wheel C. Preferably, a plurality of passages 26 and 27 extend through the wall 16 and through the journal bearing block, and in practice said passages will be staggered, as illustrated clearly in Figure 5 of the drawings. Where the journal bearing block is of wood or an absorbent material, it will be initially impregnated or saturated with the desired lubricant and after the same is inserted in the receiving socket 14 of the journal box, the liquid lubricant introduced to the lubricant reservoirs 17 and 18 through their filling openings 19 and 20 will be periodically supplied to the block and directly led to the surface of the journal bearing groove 24 through the medium of the ports 21 and 22 and passages 26 and 27. The feeding of the lubricant will be accomplished by a combined splashing and gravitational action which is caused by the sudden startings and stoppings of the cars, which tends to splash the liquid lubricant against the walls 16 and then through the downwardly directed ports 22 into the registering passages 26 and 27 and against the sides of the block. In practice, where the block is constructed of wood, the grain will be arranged vertically and due to the fact that the block is completely confined and maintained in the receiving socket 14, it is obvious that the tendency of the same to split is practically precluded.

In order to provide means for enclosing and protecting the lower and outer sides of the journal box and the journal block and journal, a cover plate is employed designated generally by the reference character 30. The cover plate includes a bottom wall 31 and a side wall 32. The bottom wall is provided with transversely arranged upstanding end flanges 33 which are formed with inwardly projecting beads 34 while the depending portion 13 is provided with transversely extending outwardly projecting beads 35 over which the beads 34 are adapted to be slidably engaged. In order to retain the cover in place, the depending portion 13 is provided with outwardly projecting apertured keeper ears 36 which are designed to project through corresponding openings 37 in the side wall 32 of the cover plate. Cotter pins or other fastening elements 38 are inserted through the apertured ears 36 to prevent accidental displacement of the cover plate. In order to facilitate the removal of the journal bearing block from its socket 14, the depending portion 13 is provided with an opening 39 in the outer side wall, through which a tool may be inserted for prying the journal block loose. It is obvious that this opening is normally covered by the cover plate wall 32.

Figure 7:
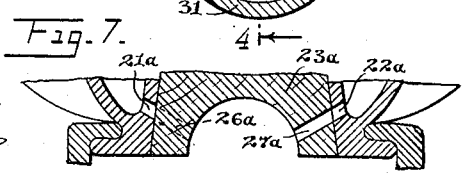
Figure 7 is a fragmentary longitudinal sectional view through the journal box and bearing block illustrating a slightly modified form of the invention.
Figure 4:
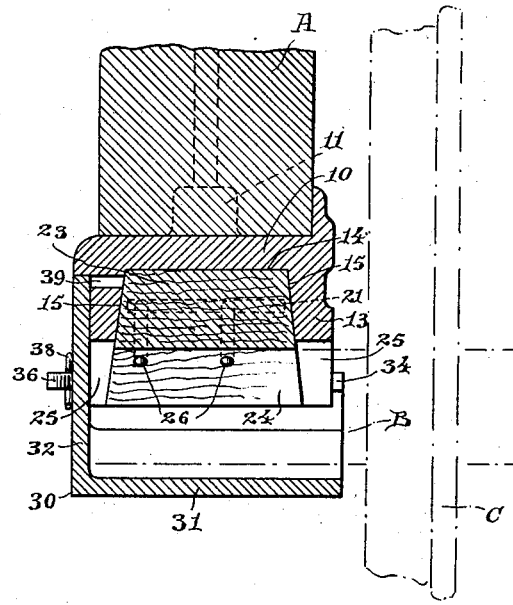
Figure 4 is a transverse sectional view through the journal box and bearing block illustrating the same mounted on the sill of the car and showing in broken lines the car wheel and journal.

In the modified adaptation of the invention illustrated in Figure 7, the ports 21$a$ and 22$a$ are formed at a point adjacent the lower end of the reservoir so that the lubricant is gravitationally fed therefrom through said ports and the passageways 26$a$ and 27$a$ of the journal bearing block 23$a$. In all other respects, the journal box and bearing are identical with the preferred form of the invention.

While the journal bearing block has been described as preferably constructed of wood or a similar absorbent material, it is to be understood that within the scope of the present invention said block may be of metal or any other non-absorbent material.

What is claimed is:

1. In a journal box for mine cars or the like, a body having a downwardly opening bearing socket and having a closed chamber adjacent said socket defining a lubricant reservoir, the portion of said body separating said socket and chamber having a lubricant outlet port for establishing communication therebetween, said port being disposed adjacent the upper end of the chamber and directed downwardly toward said socket whereby the lubricant is intermittently supplied to the bearing socket by a splashing action caused by a repeated sudden starting and stopping of the car and an absorbent bearing block disposed in the bearing socket with a lateral lubricant passage from the outlet port.

2. In a journal bearing block for mine cars or the like, a journal box having a downwardly opening bearing socket of gradually increasing cross sectional area from the upper closed end to the lower open end and an absorbent lubricant impregnated bearing block of a size and configuration to snugly fit within said socket, said journal box having a liquid lubricant chamber therein adjacent said socket and having a lubricant outlet port directed downwardly from the upper portion of the chamber to the socket for intermittently supplying lubricant to the bearing block by a splashing action caused by starting and stopping of the car, said bearing block having a transverse journal bearing groove in its under side and a lubricant passageway radiating therefrom and communicating with the lubricant chamber outlet port for directly conveying a portion of the lubricant to the journal bearing groove.

3. In a journal bearing box for mine cars, a journal box having a bearing socket and a lubricant chamber at a side of the bearing socket with a lateral port extending from the upper portion of the lubricant chamber to the bearing socket, and an absorbent bearing block in the bearing socket, the bearing block having a lubricant passage leading from the port.

4. In a journal bearing box for mine cars, a journal box having a bearing socket with two lubricant chambers, one at each end of the bearing socket, there being ports connecting the upper portions of the lubricant chambers with the bearing socket, and a bearing block in the socket having a bearing groove and obliquely disposed passages from the ports to the bearing groove.

5. In a journal bearing box for mine cars, a journal box having a bearing socket with two lubricant chambers, one at each end of the bearing socket, there being ports connecting the upper portions of the lubricant chambers with the bearing socket, and an absorbent bearing block in the socket having a bearing groove and obliquely disposed passages from the ports to the bearing groove.

THEODORE BIRD.